United States Patent [19]

Hill et al.

[11] 4,429,460

[45] Feb. 7, 1984

[54] ADJUSTABLE WIRE CUTTING PLIERS

[75] Inventors: Lee Hill, Box 22, Golconda, Nev. 89414; George Spector, New York, N.Y.

[73] Assignee: Lee Hill, Golconda, Nev.

[21] Appl. No.: 387,787

[22] Filed: Jun. 14, 1982

[51] Int. Cl.³ .............................................. B26B 13/14
[52] U.S. Cl. ...................................... 30/90.1; 30/257; 81/412
[58] Field of Search ................. 81/393, 394, 405, 406, 81/407-413, 414; 30/92, 252, 251, 257, 250, 90.1

[56] References Cited

U.S. PATENT DOCUMENTS

| 174,927 | 3/1876 | Stewart | 81/404 X |
|---|---|---|---|
| 2,557,296 | 6/1951 | Kress | 81/412 |
| 2,725,774 | 12/1955 | Tekse | 30/92 X |
| 3,422,532 | 1/1969 | Ballard | 30/252 |
| 4,296,655 | 10/1981 | Tesoro | 81/412 X |
| 4,368,577 | 1/1983 | Babb | 30/92 |

Primary Examiner—Jimmy C. Peters

[57] ABSTRACT

A pair of pliers for cutting different sized wires, including crossing levers pivoted on a bolt extending through a hole and a slot of the levers, and a compression coil spring that urges the jaws of the two levers to be spread apart.

2 Claims, 4 Drawing Figures

U.S. Patent   Feb. 7, 1984   4,429,460
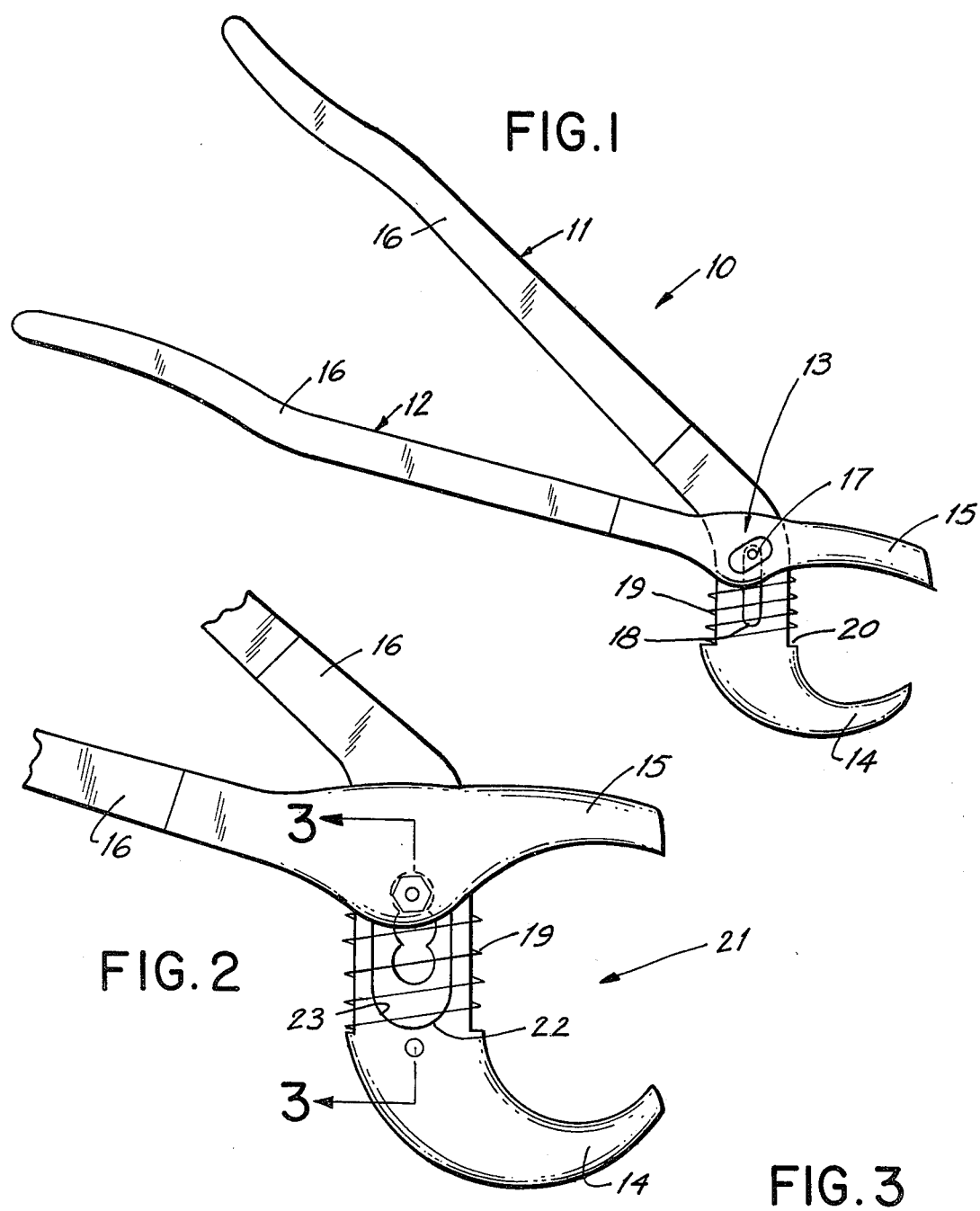

ADJUSTABLE WIRE CUTTING PLIERS

This invention relates generally to pliers that are used for cutting wires of various different thicknesses.

It is well known that numerous wire-cutting pliers have been developed in the past, but is not believed that any of these have been adapatable for use on wires of greatly varied thicknesses.

It is a principal object of the present invention to provide an adjustable wire cutting pliers which is suitable to efficiently cut any size wire from 750 MCM to no. 4 AWG, and which could be built on a 420 or 430 channel lock frame with the jaws sharpened and modified, so to create a scissors action so to be effective for such wire sizes.

Another object is to provide such pliers which would be conveniently small in size so to be adaptable for use even in a crowded disconnect switch or on a crowded electrical panel.

Still another object is to provide an adjustable wire cutting pliers which with the good quality of steel used in channel lock tools, might possibly be used to even cut A.C.S.R. without damage.

Yet a further object is to provide an adjustable wire cutting pliers which in one design thereof, has six different adjustment positions.

FIG. 1 is a side view of the invention.

FIG. 2 is an enlarged fragmentary detail of FIG. 1 and showing a design having six adjustment positions for different distances between the cutter jaws.

FIG. 3 is a cross sectional view on line 3—3 of FIG. 2.

FIG. 4 is a side view of one of the parts shown in FIG. 2 and which is insertable either right side up or upside down so that the three notches are relocated respective to the other cutter jaw.

Referring now to the drawing in greater detail, and more particularly to FIG. 1 thereof, at this time, the reference numeral 10 represents an adjustable wire cutting pliers according to the present invention, wherein there are a pair of crossing levers 11 and 12 pivotally fastened together by a bolt set 13 transversely through an intermediate portions thereof so to form a pair of co-operative jaws 14 and 15 at one end for grasping a work, and a pair of handles 16 at an opposite end for being grasped in a hand. In the present invention, the bolt set extends through a hole 17 in one of the levers and through an elongated slot 18 of the other lever. A compression coil spring 19 around one of the levers urges against the other lever so to spread the jaws apart, the spring bearing at one end against a shoulder 20 of the first said lever and bearing at its other end against a side of the second said lever. As shown one of the jaws is hook shaped so to seat a wire therein during a cutting action while the other jaw is slightly arched.

In a modified design 21 of the invention, shown in FIGS. 2, 3 and 4, the above described slot for the bolt set is made differently by comprising a slot 18a made in a separate adapter 22 that is fitted, reversibly end to end, in a slot 23 of the lever, and the slot is comprised of three circular portions 24 which are joined together, so to permit a flattened bearing portion 25 of the bolt 26 to be selectively slidable between the circular portions, as is conventionally known in adjustable pliers art. In the present design the slot 18a is located a one-half circular distance closer to one end of the adapter than than to the opposite end thereof, so to provide six different pivot positions of the three circular portions 24, depending upon which way the adapter is installed in the slot 23.

As shown at 27, the adapter and slot are correspondingly slightly dished for easy interfitting. A winged screw 28, for locking the adapter in the slot, is easily removable for a quick reversible installation of the adapter, as wished, the screw engaging a notch 29, on either end of the adapter.

While various changes may be made in the detail construction, it is understood that such changes will be within the spirit and scope of the present invention as is defined by the appended claims.

What is claimed:

1. An adjustable wire cutting pliers, comprising in combination, a pair of crossing levers pivotally secured together by a bolt set through a hole and slot at intermediate portions thereof, a pair of jaws formed at one end of said levers, and a pair of handles formed at an opposite end, a compression coil spring around one said lever urging against the other said lever so to spread said jaws apart, and means to adjust said bolt set in said slot to either one of six pivot positions.

2. The combination as set forth in claim 1, wherein said means comprises a separate adapter fitted in one said lever, said slot being in said adapter and comprising a plurality of joined circular portions selectively engaging a flattened bearing portion of a bolt of said bolt set, said slot being closer to one end of said adapter.

* * * * *